United States Patent [19]

Langer et al.

[11] 4,273,879

[45] Jun. 16, 1981

[54] INTUMESCENT FIRE RETARDANT COMPOSITES

[75] Inventors: Roger L. Langer, Hudson; Richard R. Licht, New Richmond, both of Wis.; Alan J. Marlor, Minneapolis, Minn.

[73] Assignee: Minnesota Mining and Manufacturing Company, Saint Paul, Minn.

[21] Appl. No.: 52,742

[22] Filed: Jun. 28, 1979

Related U.S. Application Data

[63] Continuation of Ser. No. 891,397, Mar. 31, 1978, abandoned, which is a continuation-in-part of Ser. No. 795,936, May 11, 1977, abandoned.

[51] Int. Cl.$^3$ ............................................. C08J 9/00
[52] U.S. Cl. ........................................ 521/91; 521/122; 521/136; 521/140; 521/907
[58] Field of Search ......................... 521/122, 91, 136

[56] References Cited

U.S. PATENT DOCUMENTS

| | | | |
|---|---|---|---|
| 2,650,206 | 8/1953 | Stock | 521/106 |
| 2,664,405 | 12/1953 | Anderson et al. | 521/100 |
| 2,880,183 | 3/1959 | Weissert | 521/106 |
| 2,947,647 | 8/1960 | Hart et al. | 521/91 |
| 3,766,100 | 10/1973 | Meyer-Stoll et al. | 521/119 |
| 3,786,004 | 1/1974 | Furuya et al. | 521/91 |
| 4,057,519 | 11/1977 | Summers et al. | 521/122 |
| 4,129,696 | 12/1978 | Markusch et al. | 521/122 |

*Primary Examiner*—Morton Foelak
*Attorney, Agent, or Firm*—Cruzan Alexander; Donald M. Sell; Edward T. Okubo

[57] ABSTRACT

The disclosure relates to flexible heat expanding, fire retardant composite materials comprising an intumescent component in granular form, an organic binder component such as an elastomer, an organic char-forming component and fillers such as clay, silica, synthetic organic staple fibers or inorganic fiberglass or ceramic fibers. These composites, when subjected to heat at about 110° C., can intumesce up to ten times their original volume.

4 Claims, No Drawings

INTUMESCENT FIRE RETARDANT COMPOSITES

CROSS REFERENCE TO RELATED APPLICATIONS

This application is a continuation of Application Ser. No. 891,397, filed Mar. 31, 1978, now abandoned, which was a continuation-in-part of Application Ser. No. 795,936, filed May 11, 1977, now abandoned.

BACKGROUND OF THE INVENTION

This invention relates to an intumescent fire retardant material, and particularly a material which has the ability to remain in the flexible unexpanded form, until heat, such as that produced by a fire, is applied, at which time it will expand to become a substantially rigid refractory thermal insulator.

Industry has long sought better materials to effectively fill voids left by burning or melting cable insulation as in the case of a fire in modern office buildings. Better thermal insulating coverings for walls, doors, ceilings, etc., are also needed. The materials heretofore employed provided protection for only limited periods because of poor stability at elevated temperatures or damage by high-pressure water sprays due to low mechanical strength. They have had the further disadvantage that they were not waterproof and had low volume expansions and pressure generation, particularly at low temperatures, with a resultant loss in their capacity to fill void areas or provide thermal insulation, thus allowing the spread of smoke or fire.

U.S. Pat. No. 3,786,604 is illustrative of the prior art and discloses the concept of filling the gap between a concrete floor slab and an upright curtain wall with a urea formaldehyde resin foam which is supported in a trough made of thin resilient sheet steel. The steel trough support is required because the mechanical strength of the foam is relatively low and that of the charred foam is even lower.

U.S. Pat. No. 3,429,836 discloses a process for producing thermal insulating coverings from organic (polystyrene and copolymers of styrene) foam materials in combination with alkali metal silicates. The composition is made into rigid boards for use as thermal insulating covers on surfaces such as walls, ceilings, doors, and the like. The formed board-like material must be coated with a protective layer of lacquers or plastic films to render it moisture resistant.

U.S. Pat. No. 3,983,082 relates to a silicone resin base fire retardant system having a temperature capability to at least about 230° C. and combines intumescent characteristics with a crusting and charring capability. These materials are intended primarily for use in aircraft gas turbine engines and they are most effective at relatively high temperatures on the order of 1000° C. or higher.

SUMMARY OF THE INVENTION

The present invention relates to flexible heat expanding, fire retardant composite materials which have the capability of expanding up to ten times their original volume when exposed to heat. The composite materials are applied in sheet or putty form and remain in their flexible unexpanded state until such time as they are subjected to heat on the order of 100° C., as in a burning building. When thus heated, the composite materials readily intumesce to seal voids caused by burning or melting material and provide seals against smoke, vapors, water, steam pressure and due to its refractoriness, protects against spread of fire from one area to another or from floor to floor. An added advantage provided by the unexpanded flexible fire retardant composites of the present invention, particularly in paste or putty form, resides in the provision of an elastomeric seal against vapors, smoke and even water.

DETAILED DESCRIPTION OF THE INVENTION

The flexible heat expanding, fire retardant composite materials of the present invention can range from a soft putty-like consistency up to a hard rubber. This range of "hardness" is achieved by selectively varying the individual components of the intumescent composite materials. Useful materials are compounded to include, by weight, about 15 to 80% of an intumescent component such as a hydrated alkali metal silicate, 15 to 40% of an organic binder component such as an elastomer which may also be a char-forming component, up to 40% of an organic char-forming component such as a phenolic resin and up to 50% fillers such as granular inorganic materials, organic or inorganic fibers, vulcanization aids, plasticizers, etc.

The fillers utilized in the present invention can be classified as "active" and "inactive". The active fillers are either chemically and/or physically reactive components and contribute to the "green" state characteristics of the intumescent composite materials of the present invention and include those fillers such as the plasticizers, vulcanization aids, blowing agents and solvents. The inactive fillers are inert materials, and include "active" fillers which may be present in excess, which are chemically unreactive and function during or after a fire as a refractory or endothermic material. The active fillers can comprise up to 20% by weight of the composite material and the inactive fillers can be present up to 40% by weight, provided, however, that the total filler content of the composite materials does not exceed 50% by weight.

It has been found that an especially preferred alkali metal silicate is granular sodium silicate with particle sizes of from 0.2 mm. to 2.0 mm., i.e., with 95% of the particles being greater than 0.2 mm., a moisture content of 5 to 30% and an $SiO_2$ and $Na_2O$ ratio of 2 to 3.75:1. In this connection, we have found that as the proportion of silica to alkali in the alkali metal silicate decreases, the rate of solution of the alkali metal silicate increases. For example, if all other factors remain the same, a sodium silicate having an $SiO_2:Na_2O$ ratio of 2.0 will dissolve more rapidly than a sodium silicate having a 3.75 ratio. This rapid attack by water is detrimental from a long-term environmental stability and performance standpoint. Accordingly, materials having $SiO_2:Na_2O$ ratios less than 2.0 have been found to be less than satisfactory. Additionally, as the $SiO_2:Na_2O$ ratio decreases, the refractoriness of the composite material also decreases and thus results in a material lacking stability when subjected to water and water sprays during a fire. Other hydrated alkali metal silicates such as potassium silicate can also be utilized to form fire retardant composites of the present invention provided that the silica to alkali ratio is within the contemplated range.

It has been found that when about 80% of the particle sizes of the alkali metal silicate, e.g., sodium silicate, utilized in the composite material, was less than about 0.15 mm., the composite material when subjected to heat intumesced only slightly. In a comparative test, a composite material produced with sodium silicate having about 95% of the particle sizes greater than 0.2 mm. expanded to twice its original volume and the composite material produced with sodium silicate particle sizes less than 0.15 mm. had a volume expansion of only 0.5.

Among the useful organic char-forming resins are phenolic resins, polycarbodiimide, urea-formaldehyde and melamine formaldehyde which, when charred in combination with the other components, contribute to formation of a highly refractory composition.

Those fillers which may be added to the composites of the present invention include quartz sand (silica), anti-oxidants, vulcanization aids, clay, fly ash, blowing agents, plasticizers, perlite, vermiculite, inorganic fibers such as glass fibers and mineral wool and organic fibers.

Exemplary binder materials include char-forming elastomers such as chloroprene and acrylonitrile rubbers and non-char-forming polymers such as chlorosulfonated polyethylene, polybutene and polysulfide polymers.

In the examples which follow, flexible sheet materials as well as paste or putty-like materials were produced by standard forming procedures. These materials begin to intumesce at temperatures as low as 110° C., and when heated to 600° C. have volume expansions of at least 2, flexural strengths of at least 20 kg. per cm.$^2$ and withstand temperatures greater than 1000° C. In addition, these materials generate expansion pressures greater than 14 kg./cm.$^2$ when tested in the Instron "Pressure Test".

EXAMPLE 1

Batching

The following materials were prebatched by dry blending:

| Ingredients | Wt. % |
|---|---|
| Neoprene W | 25 |
| Sodium Silicate - (Britesil H24) | 56 |
| Phenolic Resin - (Varcum 5485) | 11 |
| Silica (Min-U-Sil) | 8 |

Compounding

The above materials were charged to a Banbury mixer for compounding using the following conditions:

| Step | Comments |
|---|---|
| 1 | Charge all materials to a water cooled Banbury |
| 2 | Lower Ram - 3 kg./cm.$^2$ |
| 3 | Raise Ram and sweep |
| 4 | Lower Ram |
| 5 | When temperature reaches 90° C. raise Ram until temperature drops to 65° C. |
| 6 | Lower Ram |
| 7 | Repeat steps 5-6 three times. On third time, dump material and transfer to rubber mill. |

Milling

Mill material until material bands on mill. Set mill gap to desired thickness and sheet out material. The resulting sheet will be a flexible rubber-like material which can be die cut to form the desired configurations.

TESTING

The following tests were conducted on the above material:

1. Expansion (X) at 600° C. under weight where
   X=(Final Vol.-Int. Vol.) Int. Vol.

Test method: A 50 mm diameter disk is die cut from the material and the volume and weight of the disk is determined. The disk is set on a ceramic plate and a metal disk weighing 760 gm. is set on top of the material. The sample is then placed in a preheated kiln for 30 minutes at 600° C. The sample is removed and weight and volume are determined.
   In addition to expansion, LOI, green bulk density, and fired bulk density are determined.

2. Low Temperature Expansion

A sample is placed in an oven set at 120° C. to determine if expansion takes place at low temperatures. This is a pass/fail test.

3. Strength MOR (a) Test samples are prepared as follows: The green material is cut into 50 mm. long×13 mm. wide×6 mm. thick bars. These bars are expanded under confinement at a kiln temperature of 600° C. with a soak time of 30 minutes.
   (b) The modulus of rupture is determined on an Instron strength testing machine. The method used is the MOR for a three-point load, and is calculated by:

$$MOR = \frac{3PL_2}{2bd},$$

where
P=load required to break bar
L=span distance between outer supports
b=width of bar
d=depth of bar 4. Refractory Test Samples of the above material, 25 mm.×50 mm.×6 mm. are placed in a kiln at 1090° C. The samples are monitored for three hours. Failure is determined by melting of the material within three hours.

5. Pressure Generation

The pressure generated kg./cm.$^2$ during expansion is determined by use of a free-piston device. The piston is rested on a test sample which is heated. The device was loaded at room temperature and placed in an Instron tester. The sample was heated to 230° C. slowly, allowing the sample to generate pressure. Piston clearance is maintained to allow expansion gases to escape. Sample size was chosen to allow direct readout of kg./cm.$^2$ on the Instron tester.

6. In addition to the above tests, the following standard tests were also performed:

| NEL-PIA/MAERP | Standard Method of Fire Test |
|---|---|
| ASTM D-395 | Compression Set-Method B 22 Hours at Room Temperature |

| TEST RESULTS | | |
|---|---|---|
| TEST | Range All Compositions | Actual Test Results |
| Expansion - X | 2-10 | 2.46 |
| LOI - % | 20-60 | 30.9 |
| Green Density - gm./cc. | 1.0-1.65 | 1.48 |
| Fired Density - gm./cc. | .05-.5 | .34 |
| MOR - kg./cm.$^2$ | 28-84 | 40 |
| Refractory | Pass/Fail | Pass |
| Pressure Generation kg./cm.$^2$ | >14 | 18 |
| Low Temperature Expansion | Pass/Fail | Pass |
| ASTM E-119-73 | Pass/Fail | Pass |
| NEL-PIA/MAERP | Pass/Fail | Pass |
| ASTM D-395 - % compression | 10-80 | 70 |
| Shore "A" Durometer | 35-95 | 83 |

A simulated firedoor test was conducted with the intumescent material of the example. A 17 guage steel frame measuring about 180 mm.×215 mm.×25 mm. was loaded with test material and set into a refractory brick assembly, then subjected to 815° C. produced by a propane burner. The first test (A) used two 20 mm. styrofoam test panels. The second test (B) used two 20 mm. styrofoam panels sandwiched between two 1.6 mm. flexible firestop sheets. Temperatures were recorded on the hot and cold side using Chromel-Alumel thermocouples attached to the center of the frame and are shown below.

| Time | Hot Temperature (°C.) | | Cold Temperature (°C.) | |
|---|---|---|---|---|
| Minutes | A | B | A | B |
| 0 | 22 | 22 | 22 | 22 |
| 4 | 650 | 730 | 50 | 40 |
| 8 | 690 | 760 | 100 | 65 |
| 12 | 760 | 760 | 160 | 85 |
| 16 | 760 | 790 | 210 | 100 |
| 20 | 790 | 815 | 240 | 110 |
| 30 | 815 | — | 420 | — |
| 32 | — | 815 | — | 140 |

Examination after 30 minutes revealed that the styrofoam panels had been completely consumed whereas the intumescent fire retardant sheets had expanded and hardened into a rigid insulating material.

EXAMPLE 2

The following materials were batched and compounded according to the procedures of Example 1:

| Ingredients | Wt. % |
|---|---|
| Neoprene W | 24.2 |
| Sodium Silicate (Britesil H-24) | 54.2 |
| Phenolic Resin (Varcum 5485) | 10.6 |
| *Silica (Min-U-Sil) | 7.7 |
| **Zinc Oxide | 1.3 |
| **Magnesia | 1.0 |
| **Sulfur | .24 |
| **Tetramethylthirum Monosulfide (Thionex) | .32 |
| **N-Phenyl-Alpha-Napthylamine (Neozone A) | .44 |

*Inactive Filler
**Active Filler

After normal processing, the above material was heat treated at 85° C., in a forced air oven for 24 hours. The material, when tested as in Example 1, exhibited the following test results.

| Test | Test Result |
|---|---|
| Expansion - X | 7.6 |
| LOI - % | 36.5 |
| Green Density - g./cc. | 1.48 |
| Fired Density - g./cc. | 0.11 |
| MOR - kg./cm.$^2$ | 42 |
| Refractory | Pass |
| Pressure Generation - kg./cm.$^2$ | 20 |
| ASTM-E-119-73 | Pass |
| ASTM D-395 Method B - % compression | 23 |
| Low Temp. Expansion | Pass |
| Shore "A" Durometer | 94 |

EXAMPLE 3

An intumescent putty-like composition was formulated from the following materials:

| Material | Wt. % |
|---|---|
| Polybutene (Oronite #32) | 28.6 |
| Phenolic resin (Reichold Varcum Type 5416) | 21.4 |
| Sodium Silicate (Britesil H-24) | 38.6 |
| Fiberglass (Owens-Corning 799AB ¼" chopped) | 6.0 |
| Silica - (Min-U-Sil) | 5.4 |

The fiber, sodium silicate, and phenolic resin were mogul mixed into the polybutene. The composite had the consistency of a caulking putty. When fired at 600° C. for ten minutes, the material expanded 2.1×.

EXAMPLES 4-20

In these examples, intumescent fire retardant composite materials with the indicated components (weight percent) were formulated according to the compounding procedure of Example 1, (4-16) and Example 3 (17-20) and were also tested in the manner set forth in Example 1.

| | EXAMPLES | | | | | | | | | | | | | | | | |
|---|---|---|---|---|---|---|---|---|---|---|---|---|---|---|---|---|---|
| Components | 4 | 5 | 6 | 7 | 8 | 9 | 10 | 11 | 12 | 13 | 14 | 15 | 16 | 17 | 18 | 19 | 20 |
| Neoprene W | | 25 | | | 20.3 | 30 | 20.8 | 15 | 40 | 15 | 40 | 40 | 40 | | | | |
| Nitrile Rubber | | | 25 | | | | | | | | | | | | | | |
| Neoprene WRT | 25 | | | | | | | | | | | | | | | | |
| Neoprene GRT | | | | 25 | | | | | | | | | | | | | |
| Polybutene | | | | | | | | | | | | | | 40 | 15 | 25 | 40 |
| Britesil H-24 | 56 | 56 | 56 | 56 | 45.4 | 64.5 | 46.7 | 80 | 15 | 45 | 40 | 40 | 30 | 15 | 80 | 56 | 40 |
| Phenolic Resin | 11 | 11 | 11 | 11 | 8.9 | | 9.2 | 5 | 40 | 40 | | 20 | 30 | 40 | 5 | 11 | 15 |
| Filler - Inactive | 8 | 8 | 8 | 8 | 14.6 | 5.5 | 12.5 | | 5 | | 20 | | | 5 | — | 8 | 5 |
| Active | | | | | 10.8 | | 10.8 | | | | | | | | | | |
| | TEST RESULTS | | | | | | | | | | | | | | | | |
| Expansion (x) | 2.5 | 7.6 | 2.3 | 4.2 | 6 | 5.3 | 6 | 5.3 | 10 | 2.5 | 3.4 | 5 | 6.8 | 2 | 4.4 | 4.6 | 5.2 |
| LOI % | 28 | 37 | 39 | 29 | 24.5 | 29 | 28.3 | 24 | 60 | 29 | 40 | 39 | 48 | 59 | 36 | 40 | 46 |

-continued

| Components | 4 | 5 | 6 | 7 | 8 | 9 | EXAMPLES 10 | 11 | 12 | 13 | 14 | 15 | 16 | 17 | 18 | 19 | 20 |
|---|---|---|---|---|---|---|---|---|---|---|---|---|---|---|---|---|---|
| Green Density g/cc | 1.49 | 1.48 | 1.49 | 1.59 | 1.2 | 1.60 | 1.34 | 1.67 | 1.46 | 1.14 | 1.56 | 1.29 | 1.21 | 1.29 | 1.05 | 1.34 | 1.66 |
| Fired Density g/cc | .36 | .11 | .28 | .22 | 0.13 | .18 | 0.14 | .23 | .065 | .23 | .21 | .19 | .17 | .18 | .13 | .14 | .14 |
| MOR kg./cm.$^2$ | 40 | 42 | 27 | 62 | 28 | 74 | 32 | 50 | 27 | 38 | 28 | 28 | 18 | Hard | Hard | Hard | Pass |
| Refractory pass/fail | Pass | Pass | Pass | Pass | Pass | Pass | Pass | Pass | Pass | Pass | Pass | Pass | Pass | Pass | Pass | Pass | Pass |
| Low Temp. Expansion | Pass | Pass | Pass | Pass | Pass | Pass | Pass | Pass | Pass | Pass | Pass | Pass | Pass | Pass | Pass | Pass | Pass |
| NEL-PIA/MAERP | Pass | Pass | Pass | Pass | Pass | Pass | Pass | Pass | Pass | Pass | Pass | Pass | Pass | Putty | Putty | Putty | Putty |
| Shore "A" Durometer | 83 | 94 | 83 | 90 | 35 | 90 | 51 | 85 | 83 | 88 | 68 | 76 | 80 | Putty | Putty | Putty | Putty |

EXAMPLES 21–25

In these examples, intumescent fire retardant composite materials with the indicated components (weight percent) were formulated according to the compounding procedure of Example 1 and were also tested in the manner set forth in Example 1.

| Components | Examples 21 | 22 | 23 | 24 | 25 |
|---|---|---|---|---|---|
| Neoprene W | 20.3 | 22.0 | 20.0 | 20 | 23.4 |
| Britesil - H-24 | 45.4 | 40.0 | 35.0 | 25 | 52.4 |
| Phenolic Resin | 8.0 | 8.0 | 5 | 5 | 5.5 |
| (a) Agerite Stalite S | 0.37 | 0.4 | 0.39 | 0.39 | 0.46 |
| (a) Dioctyl Phthalate | 8.3 | 8.35 | 10 | 10 | 8.26 |
| (a) Unads | 1.04 | 1.1 | 1.03 | 1.03 | 1.21 |
| (a) Sulfur | 0.05 | 0.05 | 0.05 | 0.05 | 0.06 |
| (a) Red Lead Oxide | 1.04 | 1.1 | 1.03 | 1.03 | 1.21 |
| (b) Silica | 14.6 | 19.0 | 27.5 | 37.5 | 7.5 |
| (a) Active filler | 10.8 | 11 | 12.5 | 12.5 | 11.2 |
| (b) Inactive filler | 14.6 | 19 | 27.5 | 37.5 | 7.5 |
| Expansion (x) | 6.4 | 5.2 | 5.5 | 5.7 | 8.7 |
| LOI % | 33.4 | 37 | 47.4 | 47.5 | 26.5 |
| Green Density (gms/cc) | 1.4 | 1.37 | 1.37 | 1.39 | 1.4 |
| Fired Density (gms/cc) | .14 | .17 | .13 | .13 | 0.118 |
| MOR kg./cm.$^2$ | Not measured | | | | |
| Refractory pass/fail | Pass | Pass | Pass | Pass | Pass |
| Low Temperature Ex Expansion | Pass | Pass | Pass | Pass | Pass |
| Shore "A" Durometer | 50 | 50 | 45 | 45 | 55 |

| Component - Trade Name | Composition | Type | Form | Company (Supplier) |
|---|---|---|---|---|
| Neoprene | Polychloroprene | W | Rubber chunks | DuPont |
| Neoprene | Polychloroprene | WRT | Rubber chips | DuPont |
| Chemigum | Nitrile Elastomer | Ng | Solid Block | Goodyear Tire & Rubber |
| Britesil | Sodium silicate, hydrous | H-24 | Granules (10–65 mesh 95%) | Philadelphia Quartz |
| Oronite | Polybutene | 32 | Vis. Liquid | Chevron Chem. Co. |
| Varcum Phenolic Resin | Phenolic Resin | 5485 | One step phenolic thermoset powder | RCI Chemicals, Inc. |
| Varcum Phenolic Resin | Phenolic Resin | 5416 | One step phenolic thermoset powder | RCI Chemicals, Inc. |
| Maglite | Magnesium Oxide | D | Powder (fine) | Merck |
| Zinc Oxide | Zinc Oxide | — | Powder | Merck |
| Sulfur | Sulfur | Tire Brand | Powder | Stauffer Chemicals |
| Thionex | Tetramethythirum Monosulfide | E | Powder | DuPont |
| Min-U-Sil | Silica | 50 | Powder | Philadelphia Glass & Sand |
| Neozone | N-Phenyl-Alpha-Napthylamine | A | Pellets | DuPont |
| DOP | Dioctylphthalate | — | Liquid | Merck |
| Chlorowax | Chloronated Paraffin | 500-C | Liquid | Diamond Shamrock |
| Unads | Tetramethylthirum | — | Powder | R. T. Vanderbilt Co. |
| Agerite Stalite | Mixtures of alkylated diphenylamines | S | Powder | R. T. Vanderbilt Co. |
| Red Lead Oxide | $Pb_3O_4$ | 95% | Powder | Hammond Lead Products |

What is claimed is:

1. Dense, solid, flexible, heat expandable, fire retardant composite material capable of subsisting substantially indefinitely in sheet or putty form and having increased thermal insulating and sealing efficiency when exposed to temperatures above about 110° C., and capable of expanding at least up to two times its original volume consisting essentially of about 15 to 80 weight percent of sodium silicate in granular form as the intumescent component, the individual sodium silicate granules each enlarging solely upon the application of heat, about 15 to 40 weight percent of a polychloroprene binder component, up to about 40 weight percent of a phenol-formaldehyde organic char-forming resin and up to about 50 weight percent filler comprising up to about 20 weight percent active filler and up to about 40 weight percent inactive filler.

2. Fire retardant composite material of claim 1 wherein said granular sodium silicate has particle sizes of from about 0.2 to about 2.0 mm., a moisture content of about 5 to about 30 percent and a $SiO_2$ to $Na_2O$ ratio of 2 to 3.75:1.

3. Fire retardant composite material of claim 2 having a Shore "A" durometer of from about 35 to about 95.

4. Dense, solid, flexible, heat expandable, fire retardant composite material capable of subsisting substantially indefinitely in sheet or putty form and having increased thermal insulating and sealing efficiency when exposed to temperatures above about 110° C., and capable of expanding to about ten times its original volume consisting essentially of about 52 weight percent of granular sodium silicate, 95 weight percent of the particles being greater than 0.2 mm., said particles each enlarging solely upon the application of heat, said sodium silicate having a moisture content of about 19 percent, about 23 weight percent of a polychloroprene rubber, about 6 weight percent of powdered phenol-formaldehyde resin, and about 19 weight percent of a filler comprising about 11 weight percent of active filler and about 8 weight percent of inactive filler.

* * * * *

UNITED STATES PATENT AND TRADEMARK OFFICE
CERTIFICATE OF CORRECTION

PATENT NO. : 4,273,879
DATED : June 16, 1981
INVENTOR(S) : Roger L. Langer, Richard R. Licht, Alan J. Marlor It is certified that error appears in the above—identified patent and that said Letters Patent is hereby corrected as shown below:

Columns 7 and 8, line 42, before the table, insert -- As used throughout the specification, the following components are available under the trade names shown from the manufacturer or supplier indicated. The components were obtained in the form indicated. --;

Columns 7 and 8, line 65, after "Unads Tetramethylthirum" insert -- monosulfide --.

Signed and Sealed this

Twenty-fifth Day of August 1981

[SEAL]

Attest:

GERALD J. MOSSINGHOFF

Attesting Officer  Commissioner of Patents and Trademarks